(12) United States Patent
Scholtes et al.

(10) Patent No.: US 12,545,089 B2
(45) Date of Patent: Feb. 10, 2026

(54) ELECTRIC VEHICLE HAVING MOTOR SHIELD

(71) Applicant: Ford Global Technologies, LLC, Dearborn, MI (US)

(72) Inventors: Duncan Scholtes, London (GB); Matthew Sykes, Wickford (GB); Daniel Charters, Hullbridge (GB); Morteza Kiani, Troy, MI (US); Tyler Powell, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 18/366,416

(22) Filed: Aug. 7, 2023

(65) Prior Publication Data

US 2025/0050720 A1    Feb. 13, 2025

(51) Int. Cl.
*B60K 1/04*       (2019.01)
*B60K 1/00*       (2006.01)
*H02K 5/22*       (2006.01)

(52) U.S. Cl.
CPC ............... *B60K 1/00* (2013.01); *H02K 5/22* (2013.01)

(58) Field of Classification Search
CPC ...... B60K 1/04; B60K 1/00; B60K 2001/001; H02K 5/22
See application file for complete search history.

(56) References Cited

U.S. PATENT DOCUMENTS 10,507,869 B2 * 12/2019 Inoue ..................... B62D 43/10
2019/0016391 A1   1/2019 Inoue
2020/0317039 A1  10/2020 Chung et al.

FOREIGN PATENT DOCUMENTS

CN            108357565         8/2018

* cited by examiner

Primary Examiner — Jason D Shanske
Assistant Examiner — James J Triggs
(74) Attorney, Agent, or Firm — Burris Law, PLLC

(57) ABSTRACT

An electric vehicle includes a pair of opposed brackets, an attachment structure, a plate, and bushings. The pair of opposed brackets are configured to be secured to a motor of the electric vehicle. The attachment structure includes a cross bar and a pair of lower legs. The cross bar extends in a transverse direction of the electric vehicle. The pair of lower legs extend in a longitudinal direction from the cross bar and are secured to the pair of opposed brackets. The plate is secured to the cross bar and the pair of lower legs. The bushings are secured to the pair of opposed brackets and are configured to be mounted to a frame of the electric vehicle. The bushings allow the motor, the pair of opposed brackets, and the attachment structure to move upward in response to a certain applied load exceeding a predetermined threshold to the plate.

20 Claims, 11 Drawing Sheets

ELECTRIC VEHICLE HAVING MOTOR SHIELD

FIELD

The present disclosure relates to an electric vehicle having a motor shield.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. In some electric vehicles, attachment structures such as cross beams and/or plates are separate from the vehicle frame and used to support one or more electric modules (e.g., electrical charger or motor) of the electric vehicle. In one example, the attachment structures may be attached to the left and right longitudinal rails of the vehicle frame and may support and/or protect an electrical charger that charges the power storage units of the battery pack. Integration of the attachment structures into the structure of existing vehicles can be challenging.

The teachings of the present disclosure address these and other issues with attachment structures of electric vehicles.

SUMMARY

This section provides a general summary of the disclosure and is not a comprehensive disclosure of its full scope or all of its features.

In one form, the present disclosure provides an electric vehicle that includes a pair of opposed brackets, an attachment structure, a plate, and a plurality of bushings. The pair of opposed brackets are configured to be secured to a motor of the electric vehicle. The attachment structure includes a cross bar and a pair of lower legs. The cross bar extends in a transverse direction of the electric vehicle. The pair of lower legs extend in a longitudinal direction from the cross bar and is secured to the pair of opposed brackets. The plate is secured to the cross bar and the pair of lower legs and is configured to cover a portion of the motor. The plurality of bushings are secured to the pair of opposed brackets and configured to be mounted to a frame of the electric vehicle. The bushings allow the motor, the pair of opposed brackets, the attachment structure, and the plate to move in an upward direction in response to a certain applied load exceeding a predetermined threshold to the plate.

In variations of the electric vehicle of the above paragraph, which can be implemented individually or in any combination: the cross bar has a square shape cross-section; the plate includes a plurality of stiffening beads spaced apart in the transverse direction of the electric vehicle; one or more stiffening beads of the plurality of stiffening beads extend in the longitudinal direction of the electric vehicle, and wherein one or more stiffening beads of the plurality of stiffening beads extend in an oblique direction relative to the longitudinal direction of the electric vehicle; the attachment structure further includes a pair of upper legs extending in an oblique direction relative to the longitudinal direction of the electric vehicle and secured to the pair of opposed brackets; the pair of lower legs extend further in a forward direction of the electric vehicle than the pair of upper legs; each of the pair of lower legs includes an attachment wall engaging a respective bracket of the pair of opposed brackets, the attachment wall is flat; each of the pair of upper legs includes a flat attachment wall engaging a flat wall of a respective bracket of the pair of opposed brackets; each flat attachment wall includes a hook that hooks onto the flat wall of the respective bracket to inhibit movement of the attachment structure relative to the pair of opposed brackets; fasteners extending through the pair of opposed brackets and the bushings, and configured to extend through the motor to secure the pair of opposed brackets and the bushings to the motor; the plate includes a lower portion and an upper portion, the lower portion extends horizontally and the upper portion extends upward at an angle from the lower portion, the upper portion welded to the cross bar; and the lower portion of the plate includes a plurality of stiffening beads spaced apart in a transverse direction of the electric vehicle.

In another form, the present disclosure provides an electric vehicle that includes a pair of opposed brackets, an attachment structure, a plate, a plurality of bushings, and a plurality of first fasteners. The pair of opposed brackets are configured to be secured to a motor of the electric vehicle. The attachment structure includes a cross bar and a pair of lower legs. The cross bar extends in a transverse direction of the electric vehicle. The pair of lower legs extend in a longitudinal direction from the cross bar and are secured to the pair of opposed brackets. The plate is secured to the cross bar and the pair of lower legs and is configured to cover a portion of the motor. The plate includes a lower portion and an upper portion. The lower portion extends horizontally and the upper portion extends upward at an angle from the lower portion. The upper portion is welded to the cross bar. The plurality of bushings are secured to the pair of opposed brackets and configured to be mounted to a frame of the electric vehicle. The plurality of first fasteners extend through the pair of opposed brackets and the bushings, and are configured to extend through the motor to secure the pair of opposed brackets and the bushings to the motor. The bushings allow the motor, the pair of opposed brackets, the attachment structure, and the plate to move in an upward direction in response to a certain applied load exceeding a predetermined threshold to the upper portion of the plate.

In variations of the electric vehicle of the above paragraph, which can be implemented individually or in any combination: the cross bar has a square shape cross-section; the lower portion of the plate includes a plurality of stiffening beads spaced apart in the transverse direction of the electric vehicle; the attachment structure further includes a pair of upper legs extending in an oblique direction relative to the longitudinal direction of the electric vehicle and secured to the pair of opposed brackets; each of the pair of lower legs includes a first flat attachment wall engaging a first flat wall of a respective bracket of the pair of opposed brackets; each of the pair of upper legs includes a second flat attachment wall engaging a second flat wall of a respective bracket of the pair of opposed brackets; second fasteners extend through the first flat attachment walls of the pair of lower legs and the first flat walls of the pair of opposed brackets to secure the attachment structure to the pair of opposed brackets; third fasteners extend through the second flat attachment walls of the pair of upper legs and the second flat walls of the pair of opposed brackets to further secure the attachment structure to the pair of opposed brackets; and a respective lower leg of the pair of lower legs, a respective upper leg of the pair of uppers legs and a wall of a respective bracket of the pair of brackets cooperate to form a triangular shape.

In yet another form, the present disclosure provides an electric vehicle that includes a pair of opposed brackets, an attachment structure, a plate, a plurality of bushings, and a plurality of fasteners. The pair of opposed brackets configured to be secured to the motor of the electric vehicle. The attachment structure includes a cross bar, a pair of lower legs, and a pair of upper legs. The cross bar has a square shape cross-section and extends in a transverse direction of the electric vehicle. The pair of lower legs extend in a longitudinal direction from the cross bar and are secured to the pair of opposed brackets. The pair of upper legs extend in an oblique direction relative to the longitudinal direction of the electric vehicle and are secured to the pair of opposed brackets. The plate is partially wrapped around the attachment structure and is secured to the cross bar and the pair of lower legs. The plate includes a lower portion and an upper portion. The lower portion extends horizontally and the upper portion extends upward at an angle from the lower portion. The upper portion is welded to the cross bar. The plurality of bushings are secured to the pair of opposed brackets and configured to be mounted to a frame of the electric vehicle. The plurality of fasteners extend through the pair of opposed brackets and the bushings, and are configured to extend through the motor to secure the pair of opposed brackets and the bushings to the motor. The bushings allow the motor, the pair of opposed brackets, the attachment structure, and the plate to move in an upward direction in response to a certain applied load exceeding a predetermined threshold to the upper portion of the plate. A respective lower leg of the pair of lower legs, a respective upper leg of the pair of uppers legs and a wall of a respective bracket of the pair of brackets cooperate to form a triangular shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
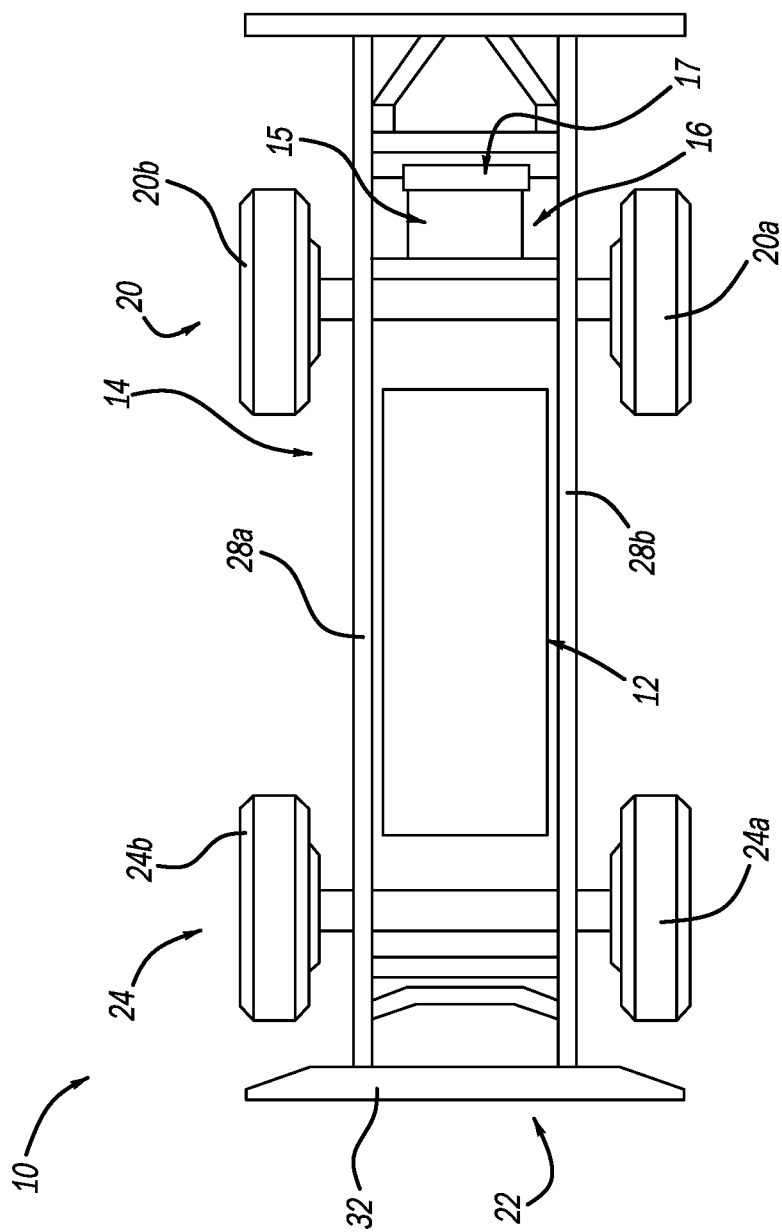
FIG. 1 is a schematic view of a vehicle including a vehicle frame and a motor shield assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a battery pack or battery structure 12, a vehicle frame 14, a structural assembly 16, and a motor shield assembly 17. The battery pack 12 may be rechargeable and may include lithium-ion batteries or any other suitable electrical power storage units. The battery pack 12 may be disposed at various locations of the vehicle 10 and may be mounted to the vehicle frame 14. In this way, the battery pack 12 is supported by the vehicle frame 14 and is remote from a passenger cabin (not shown) and cargo compartments (not shown) of the vehicle 10, therefore, not occupying space that would otherwise be available for passengers or cargo. The battery pack 12 powers a motor 15 to drive a set of wheels 20a, 20b. In the example provided the wheels 20a, 20b are rear wheels and the motor 15 is also referred to as the rear motor 15, though other configurations can be used. Similarly, the battery pack 12 can power a second motor (not shown) to selectively drive a different set of wheels 24a, 24b. In the example provided, the wheels 24a, 24b are front wheels, though other configurations can be used. In some forms, the battery pack 12 includes an outer support frame (not specifically shown) and a pair of battery cage longitudinal members (not specifically shown). The pair of battery cage longitudinal members extend along opposing sides of the outer support frame, and are secured to the outer support frame and the vehicle frame 14.

With reference to FIGS. 1-4, the vehicle frame 14 is made of a metal material such as steel, for example, and is the main supporting structure of the vehicle 10, to which various components are attached either directly or indirectly. The vehicle frame 14 includes a front end 22, a pair of rockers or longitudinal outer rails 28a, 28b and cross-members or cross beams 30a, 30b, 30c. The front end 22 includes, inter alia, a bumper 32 that extends in a transverse direction relative to a longitudinal direction X of the vehicle 10. The pair of longitudinal outer rails 28a, 28b are spaced apart from each other. In some forms, the pair of longitudinal outer rails 28a, 28b are spaced apart from the outer support frame, for example, of the battery structure 12. In this way, components such as electrical conduits (not shown), for example, may extend along and between the outer support frame of the battery structure 12 and the pair of outer rails 28a, 28b.

Each outer rail 28a, 28b is elongated and extends along the longitudinal direction X of the vehicle 10. In some forms, the outer rail 28a, 28b is secured to a respective battery cage longitudinal member (not shown) with mechanical fasteners. The outer rail 28a, 28b may include a cavity having one or more compression tubes or compression limiters 29 (FIG. 3) disposed therein. The compression tubes 29 inhibit the longitudinal rail 28a, 28b from deforming. Additionally, or alternatively, each outer rail 28a, 28b may include other reinforcement structures (not shown) disposed within and secured to the outer rail 28a, 28b to further provide reinforcement to the outer rail 28a, 28b.

The cross members 30a, 30b, 30c are structural members that extend in a transverse direction Y relative to the longitudinal direction X of the vehicle 10 and connect the outer rails 28a, 28b to each other. The cross members 30a, 30b, 30c are spaced apart from each other along the longitudinal direction X of the vehicle 10. The cross members 30a, 30b are secured to the outer rails 28a, 28b, thereby forming a box structure 38 that supports the rear motor 15. In some forms, two adjacent cross beams located near a front of the vehicle 10 (i.e., located further toward the front of the vehicle 10 than the battery pack 12) and secured to the outer rails 28a, 28b at the front of the vehicle 10 may form a box structure that supports the front motor (not shown), for example.

Mounting brackets 34 are disposed between a pair of longitudinal inner rails 36a, 36b and extend generally in a longitudinal direction of the vehicle 10. In some forms, an end portion of each mounting bracket 34 may angle inwardly toward a center of the vehicle 10. In the example illustrated, the mounting brackets 34 are secured to the cross beams 30b, 30c. In some forms, the mounting brackets 34 are secured to the cross beams 30b, 30c using mechanical fasteners or any other suitable attachment means such as welding, for example. In the example illustrated, a suspension system 40 (FIG. 2) is secured to the vehicle frame 14 via the mounting brackets 34 and secures the wheels 20a, 20b of the vehicle 10 to the vehicle frame 14. The suspension system 40 provides a smooth ride by absorbing energy from various road bumps while driving. The suspension system 40 includes various components such as upper and lower control arms, shock absorbers, and ball joints, for example. It should be understood that the vehicle 10 of the present disclosure can be of a uni-body architecture or a body-on-frame architecture without departing from the principles disclosed herein.

Figure 2:
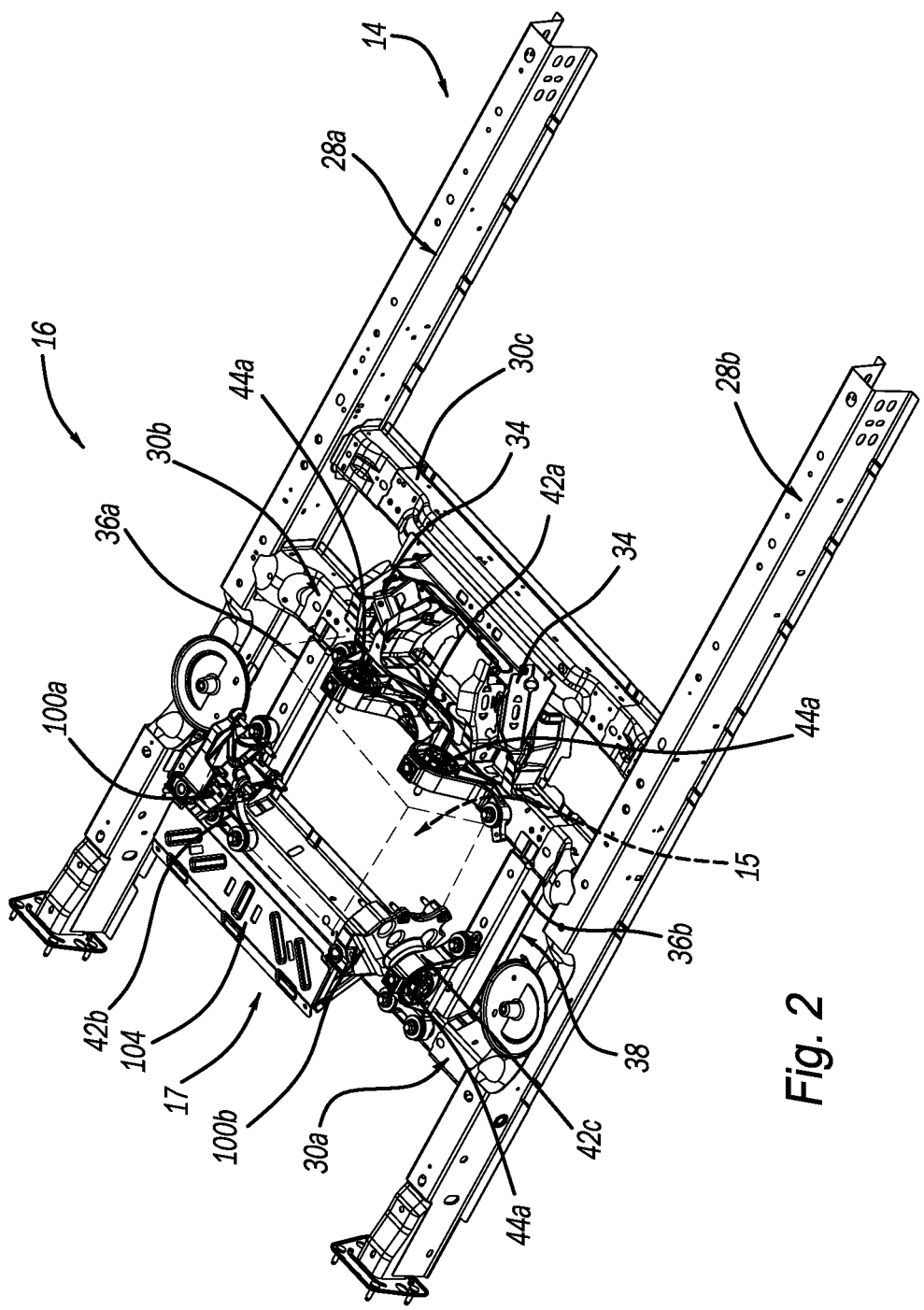
FIG. 2 is a perspective bottom view of the motor shield assembly of FIG. 1 attached to the vehicle frame of the vehicle.
Figure 3:
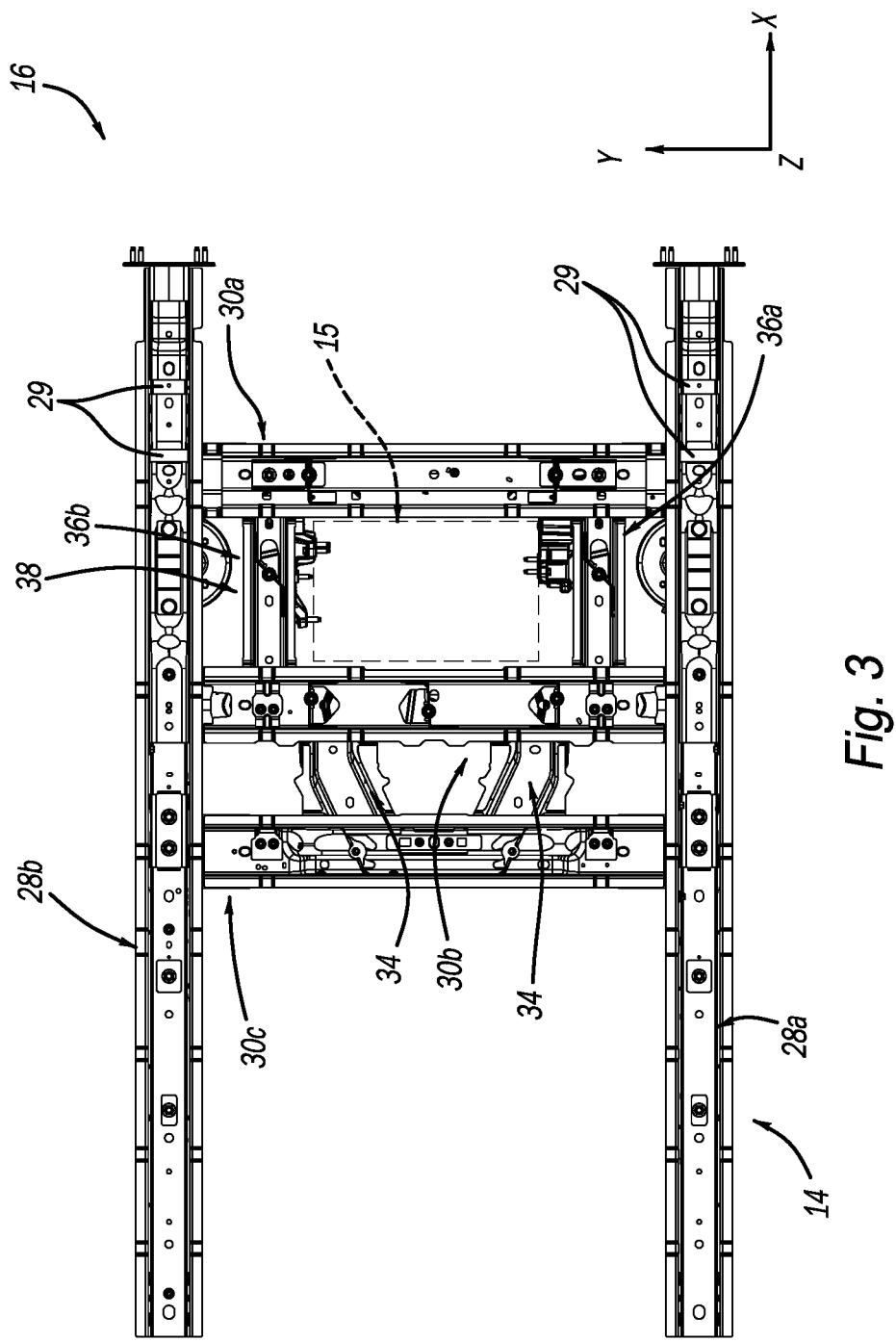
FIG. 3 is a top view of the vehicle frame of the vehicle of FIG. 1 with a schematically shown motor of the vehicle coupled to the vehicle frame.
Figure 4:
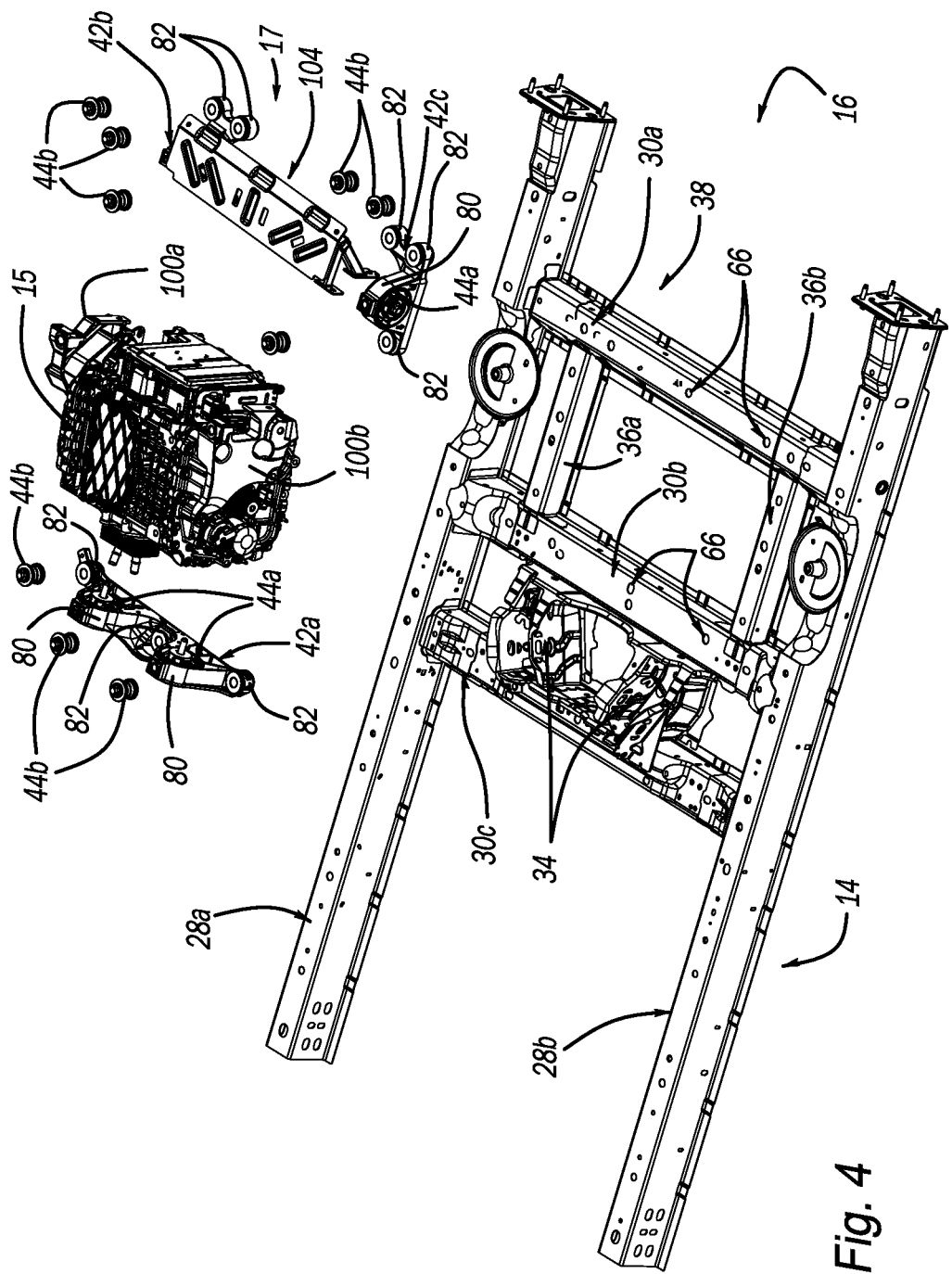
FIG. 4 is a perspective view of the motor shield assembly of FIG. 1 exploded from the motor and the vehicle frame.
Figure 5:
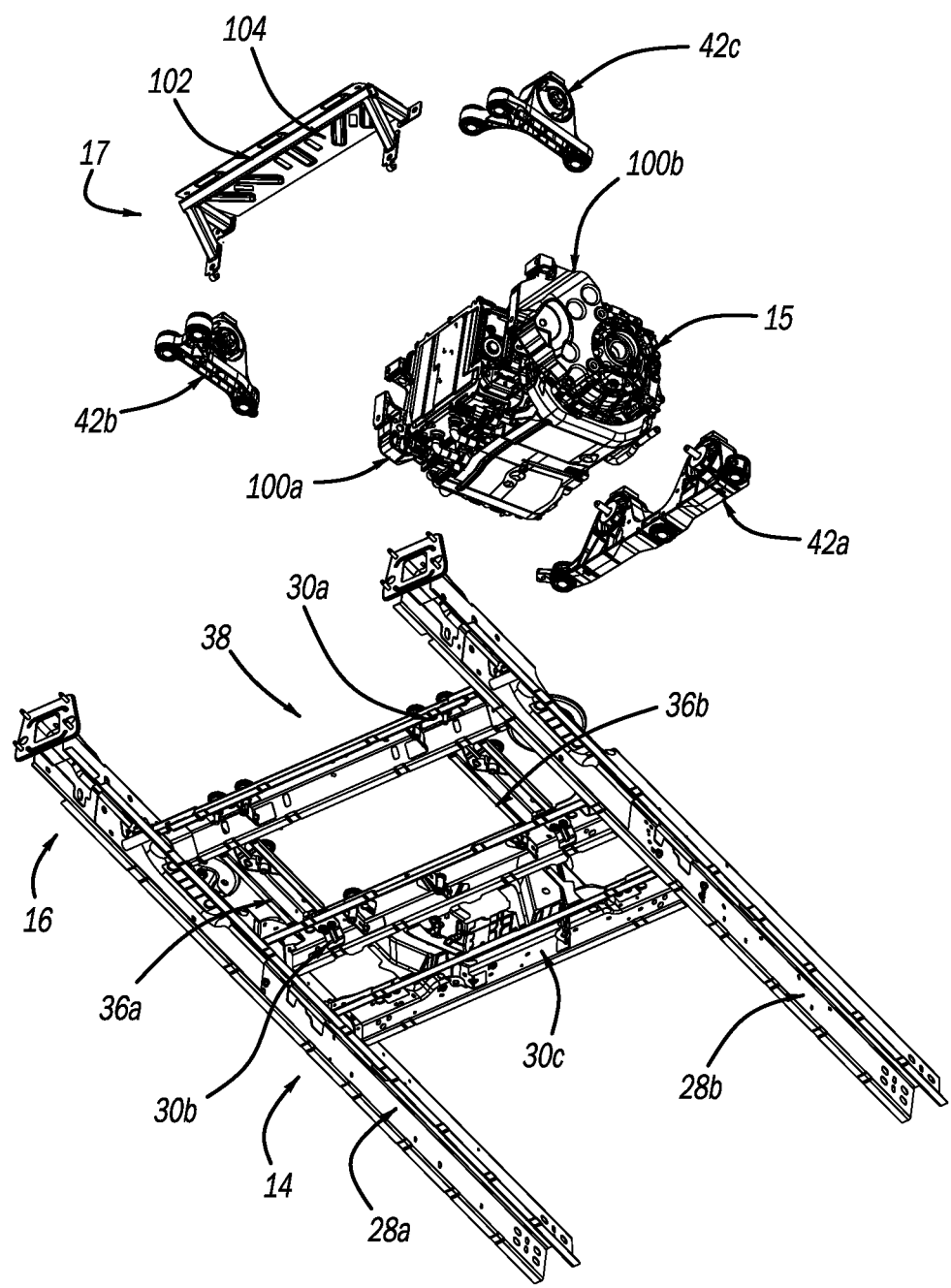
FIG. 5 is another perspective view of the motor shield assembly of FIG. 1 exploded from the motor and the vehicle frame.

With continued reference to FIGS. 2-4, the structural assembly 16 is positioned adjacent the battery pack 12 and supports one or more components of the vehicle 10 such as the rear motor 15, for example. In this way, a separate subframe mounted to the vehicle frame 14 and supporting one or more components of the vehicle such as the rear motor 15, for example, can be omitted, thus, reducing the weight of the vehicle 10. The structural assembly 16 includes the pair of longitudinal outer rails 28a, 28b, the cross beams 30a, 30b, 30c, the pair of opposed longitudinal inner rails 36a, 36b, a plurality of housings 42a, 42b, 42c, a first set of bushings 44a (FIGS. 2 and 4), and a second set of bushings 44b (FIG. 4). The pair of opposed longitudinal inner rails 36a, 36b are located inboard of the pair of longitudinal outer rails 28a, 28b and are spaced apart from the pair of longitudinal outer rails 28a, 28b. The pair of opposed longitudinal inner rails 36a, 36b are located between the cross members 30a, 30b and are welded to the cross members 30a, 30b. In some forms, the pair of opposed longitudinal inner rails 36a, 36b are secured to the cross members 30a, 30b using mechanical fasteners such as bolts, screws, or rivets, or using any other suitable attachment means.

Each housing 42a, 42b, 42c is made of a metal material such as aluminum or steel, for example, and is mounted to the box structure 38. That is, the housing 42a is mounted to the cross beam 30b of the box structure 38, the housing 42b is mounted to the cross beam 30a and the inner rail 36a of the box structure 38, and the housing 42c is mounted to the cross beam 30a and the inner rail 36b of the box structure 38. Each housing 42a, 42b, 42c includes one or more cylindrical portions 80 (FIG. 4) and a plurality of flanges 82 (FIG. 4). Each cylindrical portion 80 is located between two flanges 82 and defines an opening.

The first set of bushings 44a are disposed in respective housings 42a, 42b, 42c and have a stiffness that is less than a stiffness of the second set of bushings 44b. Each bushing 44a of the first set of bushings 44a has a cylindrical shape and extends in a direction perpendicular to the vertical direction Z. In some forms, one or more bushings 44a extend in the longitudinal direction X of the vehicle 10 and one or more bushings 44a extend in a lateral direction Y of the vehicle 10. In some forms, each busing 44a may extend in the vertical direction Z and each bushing 44b may extend perpendicular to the vertical direction Z. Each bushing 44a of the first set of bushings 44a has a diameter that is greater than a diameter of the second set bushings 44b.

Figure 7:
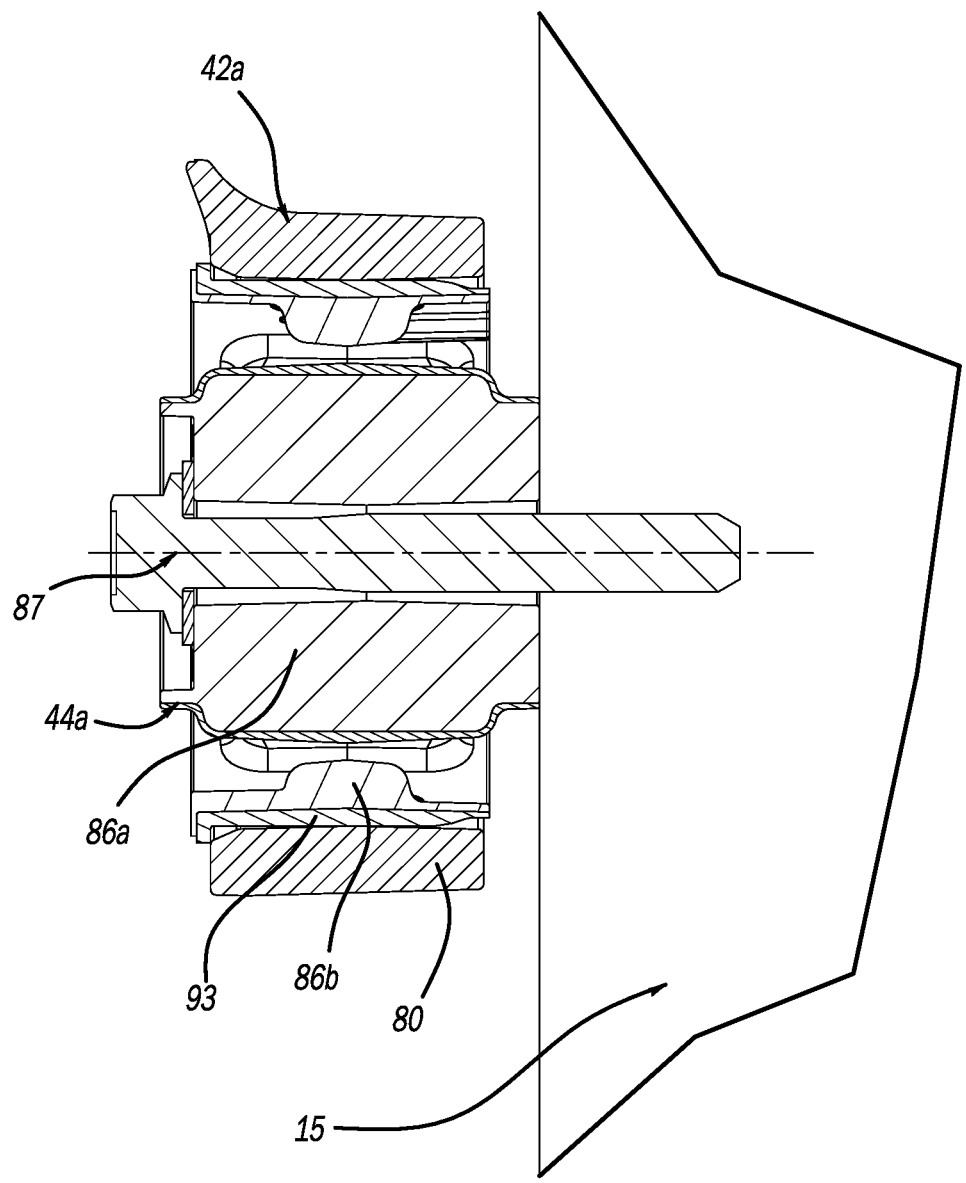
FIG. 7 is a cross-sectional view of the vehicle frame taken along line 7-7 of FIG. 6.
Figure 8:
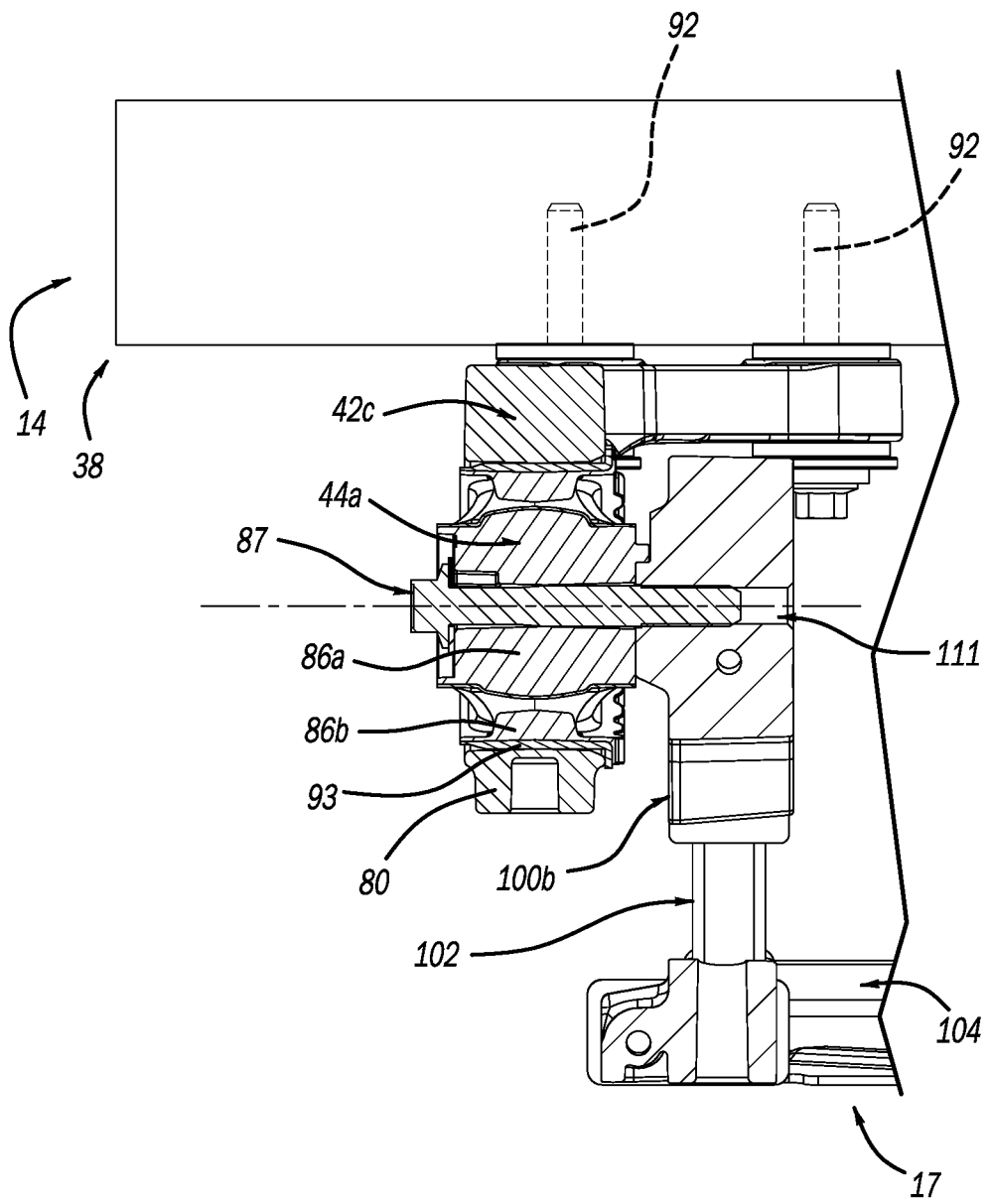
FIG. 8 is a cross-sectional view of the vehicle frame taken along line 8-8 of FIG. 6.
Figure 9A:
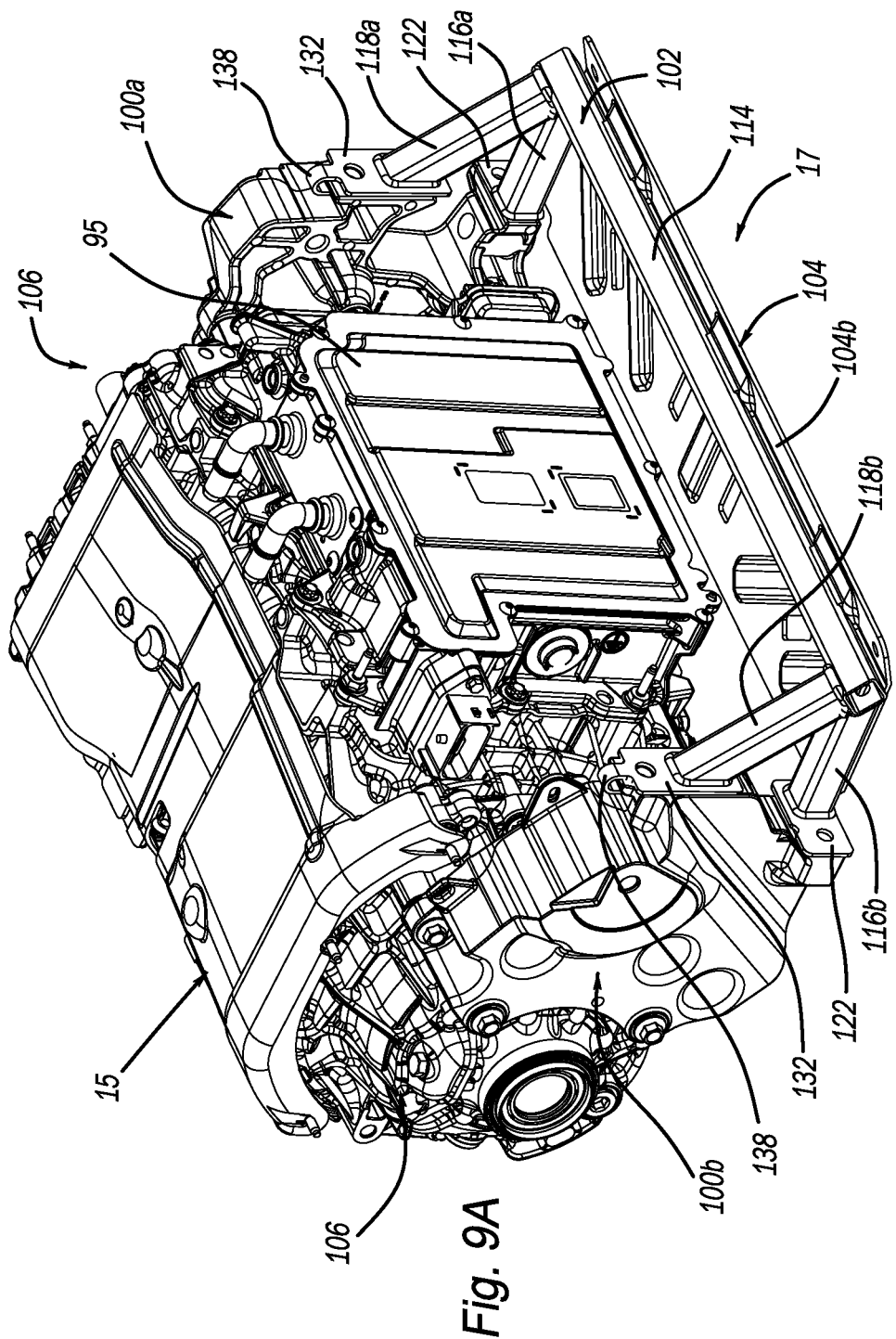
FIG. 9A is a perspective view of the motor shield assembly of FIG. 1.
Figure 9B:
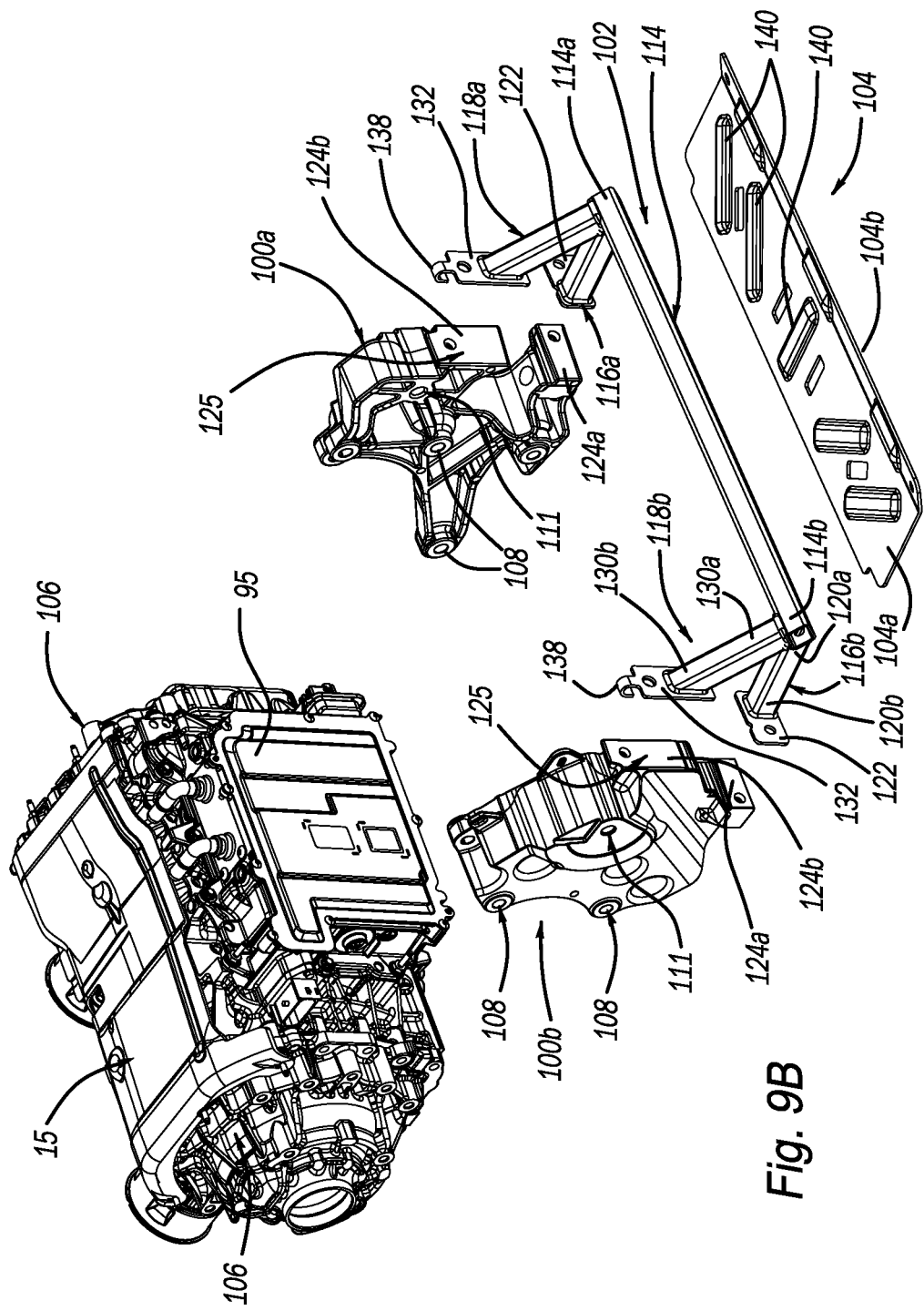
FIG. 9B is an exploded perspective view of the motor shield assembly of FIG. 1.

With reference to FIGS. 7 and 8, each bushing 44a is press-fit within the opening of the cylindrical portion 80 of the respective housing 42a, 42b, 42c. Each bushing 44a is mechanically coupled to the rear motor 15 and includes an inner sleeve 86a, an elastic body 86b and an outer sleeve 93. The inner sleeve 86a is cylindrical shape and is made of a metal material. The inner sleeve 86a is attached to (e.g., press-fitted) the elastic body 86b and defines an opening extending therethrough.

The elastic body 86b may be bonded to and molded into the inner sleeve 86a and may be a cylindrical shape. The elastic body 86b is also disposed between the inner sleeve 86a and the outer sleeve 93. The elastic body 86b deforms elastically when a force is applied to the elastic body 86b and returns to its original shape once the force is removed from the elastic body 86b. In the example provided, the elastic body 86b is made of an elastomeric material such as polyurethane, silicones, or a rubber, for example. The elastic body 86b may have a different shape or pattern than the elastic body (not specifically shown) of the second set of bushings 44b. In the example illustrated, the elastic body 86b has a cross-sectional shape that is variable (i.e., not constant/uniform). In this way, the stiffness of the elastic body 86b is different (e.g., less than) than the stiffness of the elastic body of the second set of bushings. In some forms, the elastic body 86b may include a cross-sectional shape that is constant/variable.

The outer sleeve 93 may be press-fit onto the elastic body 86b such that the outer sleeve 93 houses the elastic body 86b and the inner sleeve 86a. The outer sleeve 93 is also attached to the respective housing 42a, 42b, 42c. For example, the outer sleeve 93 may be press-fit into the central opening of the cylindrical portion 80 of the respective housing 42a, 42b, 42c. Fasteners 87 extending horizontally through respective bushings 44a of the first set of bushings 44a in the housing 42a also extends through the rear motor 15, thereby securing the housing 42a and the rear motor 15 to each other. Fasteners 87 extending horizontally through respective bushings 44a of the first set of bushings 44a in the housing 42b, 42c also extends at least partially through the motor shield assembly 17 to secure the housing 42b, 42c and the motor shield assembly 17 to each other. The fasteners 87 may be a screw or a bolt, for example.

Each bushing 44b is press-fit within an opening of a respective flange 82 of the housing 42a, 42b, 42c. Each bushing 44b also has a cylindrical shape that extends in the vertical direction Z. Each bushing 44b is mechanically coupled to the box structure 38 and includes an inner sleeve (not specifically shown), an elastic body (not specifically shown), and an outer sleeve (not specifically shown). The inner sleeve is cylindrical shape and is made of a metal material. The inner sleeve is attached to (e.g., press-fitted) the elastic body and defines an opening extending therethrough.

The elastic body may be bonded to and molded into the inner sleeve and may be a cylindrical shape. The elastic body is also disposed between the inner sleeve and the outer sleeve. The elastic body deforms elastically when a force is applied to the elastic body and returns to its original shape once the force is removed from the elastic body. In the example provided, the elastic body is made of an elastomeric material such as polyurethane, silicones, or a rubber, for example, that is stiffer than the elastomeric material of the elastic body 86b. In some forms, the elastic body 86b of the bushings 44a is stiffer than the elastic body of the bushings 44b. In some forms, the elastic body 86b has a diameter that is smaller than the diameter of the elastic body of the bushings 44b.

Figure 6:
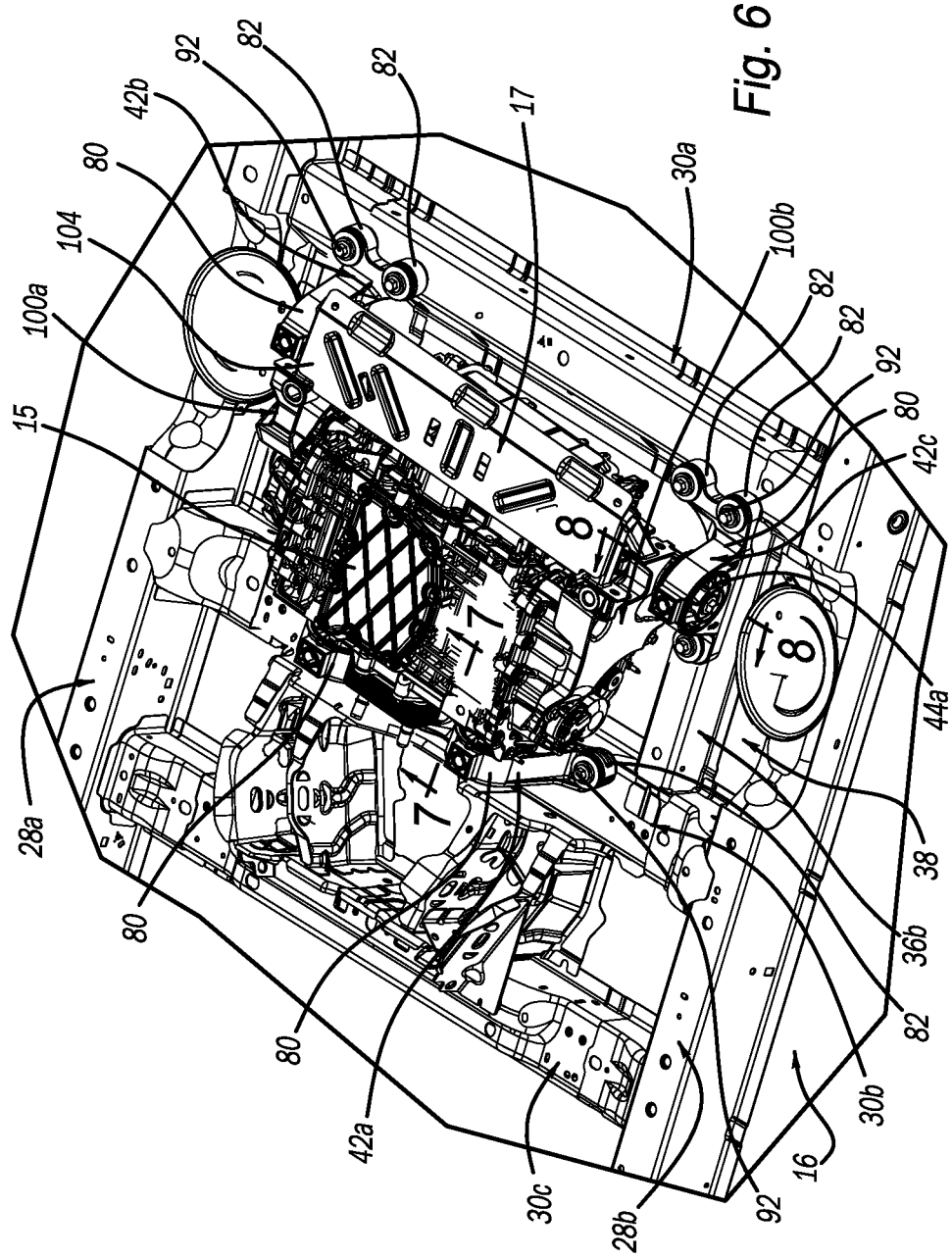
FIG. 6 is a perspective view of a portion of the vehicle frame of FIG. 1.

In one form, the outer sleeve is a cylindrical shape and is made of a metal material. The outer sleeve may be press-fit onto the elastic body such that the outer sleeve houses the elastic body and the inner sleeve. The outer sleeve is also attached to a respective flange 82 of the housing 42a, 42b, 42c. For example, the outer sleeve may be press-fit into the opening of the respective flange 82 of the housing 42a, 42b, 42c. Fasteners 92 (FIG. 6) extend vertically through respective apertures 66 (FIG. 4) of the box structure 38, respective second bushings 44b of the set of second bushings 44b, and respective housings 42a, 42b, 42c, thereby securing the box structure 38, the respective second bushings 44b and the respective housings 42a, 42b, 42c to each other. One example of such a structural assembly 16 is disclosed in U.S. patent application Ser. No. 18/366,474, filed on the same day as the present application, and titled "STRUCTURAL ASSEMBLY FOR ELECTRIC VEHICLE," which is commonly owned with the present application and the contents of which are incorporated herein by reference in its entirety.

With reference to FIGS. 6, 9A, 9B, and 10, the motor shield assembly 17 is secured to the rear motor 15 (e.g., secured to a cast housing of the rear motor 15) such that the motor shield assembly 17 covers the rear motor 15 at a predetermined location. In the example illustrated, the motor shield assembly 17 is secured to the rear motor 15 and is configured to cover a portion of the rear motor 15 where the inverter 95 or other electrical components of the rear motor 15 are located, for example. In some forms, the motor shield assembly 17 is secured to the rear motor 15 and is configured to cover other components or parts of the rear motor 15. During a direction of force to the motor shield assembly 17 which may occur in certain applied loads exceeding a predetermined threshold, the bushings 44a, 44b allow the rear motor 15 and the motor shield assembly 17 to move in an upward direction (e.g., vertically) relative to the vehicle frame 14. For example, such loads may come into play in the case of a certain impact event.

The motor shield assembly 17 includes a pair of opposed brackets 100a, 100b, an attachment structure 102, and a plate 104. Each bracket 100a, 100b is secured to a respective side 106 of the rear motor 15 and includes a plurality of attachment points 108 where the bracket 100a, 100b is removably secured to the rear motor 15. In the example illustrated, the attachment points 108 are apertures extending through the bracket 100a, 100b. Fasteners 110 extend through the apertures and through the rear motor 15, thereby securing the brackets 100a, 100b to the rear motor 15. A fastener 87 extending horizontally through a respective bushing 44a located in the housing 42b, 42c also extends through a respective opening 111 (FIG. 8) of the bracket 100a, 100b, thereby securing the housing 42b, 42c and the bracket 100a, 100b to each other. In some forms, the brackets 100a, 100b may be secured to the rear motor 15 via a snap fit or any other suitable attachment means that allow for the brackets 100a, 100b to be removed from the cast housing 98 of the rear motor 15 for servicing to the rear motor 15 and/or the brackets 100a, 100b, for example.

The attachment structure 102 is made of a metal such as aluminum or steel, for example, and includes a cross bar 114, a pair of lower legs 116a, 116b, and a pair of upper legs 118a, 118b. In one form, the attachment structure 102 is made of a single part that may be formed using additive manufacturing (i.e., 3D printing), for example. In another form, the attachment structure 102 is made of a plurality of separate parts that may be welded or otherwise secured to each other to form a unitized structure. The cross bar 114 is of a tubular configuration and extends in the transverse direction of the electric vehicle 10. In the example illustrated, the cross bar 114 has a square shaped cross-section. In some forms, the cross bar 114 may include a rectangular shaped cross-section or any other suitable shaped cross-section for attaching the plate 104 thereto.

The pair of lower legs 116a, 116b extend forward in a longitudinal direction from the cross bar 114 and are secured to the pair of opposed brackets 100a, 100b. In the example illustrated, the lower leg 116a extends from or near an end 114a of the cross bar 114 and is secured to the bracket 100a, and the lower leg 116b extends from or near an opposing end 114b of the cross bar 114 and is secured to the bracket 100b. Stated differently, each of the lower legs 116a, 116b have proximal ends 120a extending from the cross bar 114. In the example illustrated, the pair of lower legs 116a, 116b are of a tubular configuration having a square shaped cross-section. In some forms, the pair of lower legs 116a, 116b may include a rectangular shaped cross-section or any other suitable shaped cross-section. Each of the lower legs 116a, 116b also has a distal end 120b that is secured to respective brackets 100a, 100b. Each distal end 120b has a flat attachment wall 122 that faces toward a front of the electrical vehicle 10 and that engages a flat, lower surface 124a of wall 125 of the respective brackets 100a, 100b. A fastener (not shown) extends through the flat attachment wall 122 of the lower leg 116a, 116b and the flat, lower surface 124a of the respective bracket 100a, 100b, thereby removably securing the attachment structure 102 to the brackets 100a, 100b.

The pair of upper legs 118a, 118b extend from the cross bar 114 in an oblique direction relative to the longitudinal direction of the electric vehicle 10 and are secured to the pair of opposed brackets 100a, 100b. In the example illustrated, the pair of lower legs 116a, 116b extend further in the forward direction of the electric vehicle 10 than the pair of upper legs 118a, 118b. In the example illustrated, the upper leg 118a extends from or near the end 114a of the cross bar 114 and is secured to the bracket 100a, and the upper leg 118b extends from or near an opposing end 114b of the cross bar 114 and is secured to the bracket 100b. Stated differently, each of the upper legs 118a, 118b have proximal ends 130a extending from the cross bar 114. In the example illustrated, the pair of upper legs 118a, 118b are of a tubular configuration having a square shaped cross-section. In some forms, the pair of upper legs 118a, 118b may include a rectangular shaped cross-section or any other suitable shaped cross-section. Each of the upper legs 118a, 118b also has a distal end 130b that is secured to respective brackets 100a, 100b. Each distal end 130b has a flat attachment wall 132 that faces toward the front of the electrical vehicle 10 and that engages a flat, upper surface 124b of the wall 125 of the respective brackets 100a, 100b.

A fastener (not shown) extends through the flat attachment wall 132 of the upper leg 118a, 118b and the flat, upper surface 124b of the respective bracket 100a, 100b, thereby further removably securing the attachment structure 102 to the brackets 100a, 100b. Each flat attachment wall 132 includes a hook 138 that hooks onto the wall 125 of the respective bracket 100a, 100b to inhibit movement of the attachment structure 102 relative to the pair of opposed brackets 100a, 100b prior to the attachment structure 102 being mechanically fastened to the brackets 100a, 100b by the fasteners.

Figure 10:
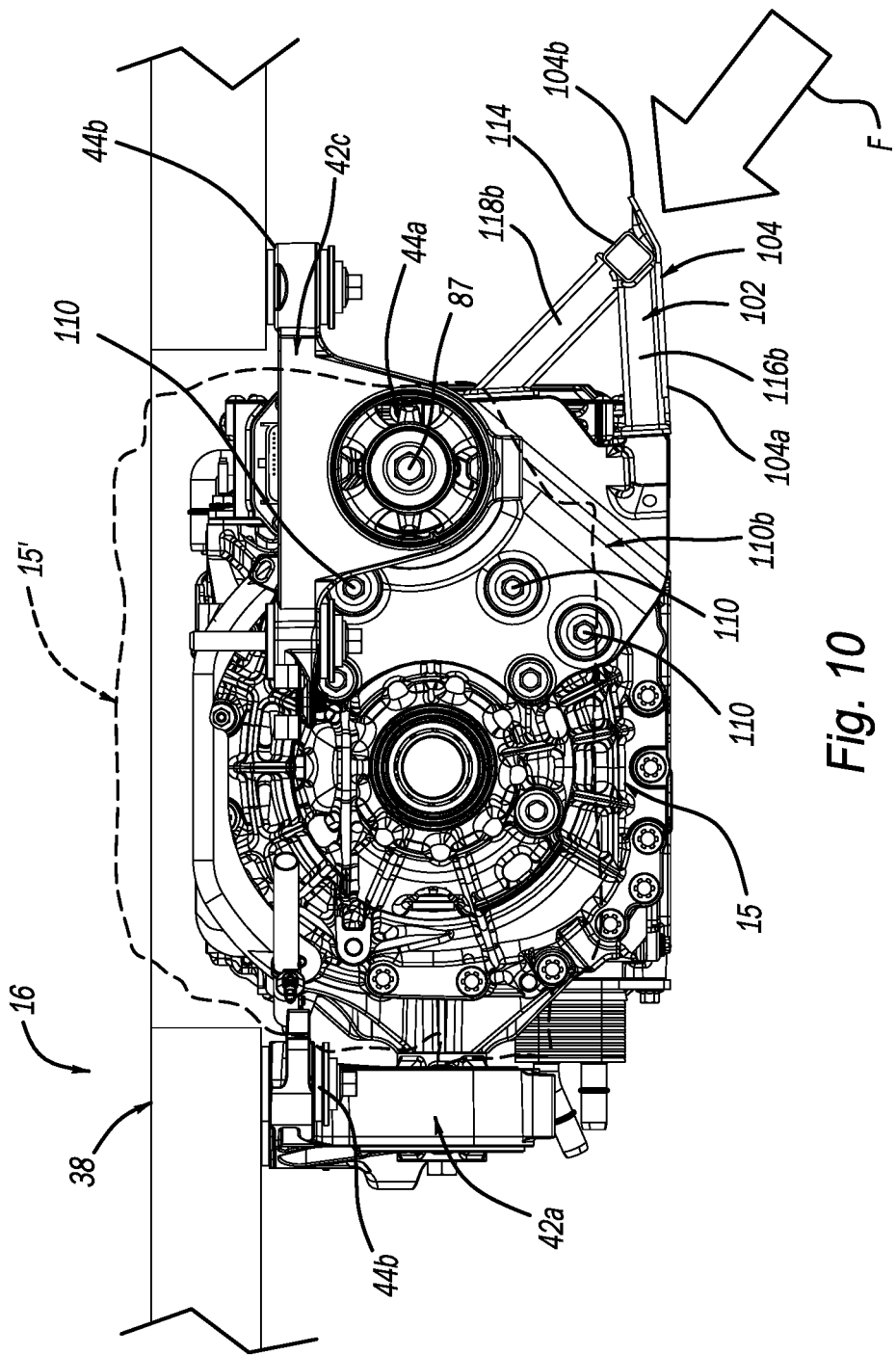
FIG. 10 is a side view of the motor shield assembly of FIG. 1 during certain applied loads exceeding a predetermined threshold showing, in dashed lines, an exaggerated schematic view of a rear motor moving in an upward direction relative to the vehicle frame.

The plate 104 is secured (e.g., welded) to the cross bar 114 and the pair of lower legs 116a, 116b and covers at least a portion of the rear motor 15. The plate 104 extends in the transverse direction of the electric vehicle 10 and extends substantially an entire length of the rear motor 15. The plate 104 includes a lower portion 104a and an upper portion 104b. The lower portion 104a extends in horizontal direction and is secured to the pair of lower legs 116a, 116b. The lower portion 104a of the plate 104 also includes a plurality of stiffening beads 140 to enhance the stiffness of the plate 104. In the example illustrated, the stiffening beads 140 are spaced apart in the transverse direction of the electric vehicle 10. One or more stiffening beads 140 extend in the longitudinal direction of the electric vehicle 10 and one or more stiffening beads 140 extend in an oblique direction relative to the longitudinal direction of the electric vehicle 10. The upper portion 104b of the plate 104 extends upward at an angle from the lower portion 104a and is welded to the cross bar 114. In one form, the angle is an obtuse angle. The upper portion 104b of the plate 104 is configured to receive the direction of force, which may occur in certain applied loads exceeding a predetermined threshold. The first set of bushings 44a and the second set of bushings 44b allow the rear motor 15 and the motor shield assembly 17 to move vertically upward relative to the vehicle frame 14. In this way, as shown in FIG. 10, the first set of bushings 44a and the second set of bushings 44b allow the rear motor 15 to move vertically upward relative to the vehicle frame 14 (compare rear motor 15 to rear motor 15' shown in phantom lines) when a direction of force F is applied to the upper portion 104b of the plate 104 in certain applied loads exceeding a predetermined threshold. It should also be understood that the pair of opposed brackets 100a, 100b, the attachment structure 102, and the plate 104 secured to the rear motor 15 also moves vertically upward relative to the vehicle frame 14 when the direction of force F is applied to the plate 104.

The motor shield assembly 17 of the present disclosure provides the advantage of taking a shield that would traditionally be secured to a frame of the vehicle to take certain applied loads exceeding a predetermined threshold without redirecting forces, and secure it to the rear motor 15 that is shielded through design of the bushings 44a, 44b and the geometry to redirect certain applied loads exceeding a predetermined threshold. In this way, the motor shield assembly 17 of the present disclosure allows for the powertrain to be shielded and work with the bushings 44a, 44b to lift the powertrain clear of any obstacles/objects, thus, redirecting and reducing forces seen by the powertrain.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. An electric vehicle comprising:
a pair of opposed brackets configured to be secured to a motor of the electric vehicle;
an attachment structure including a cross bar and a pair of lower legs, the cross bar extending in a transverse direction of the electric vehicle, the pair of lower legs extending in a longitudinal direction from the cross bar and secured to the pair of opposed brackets;

a plate secured to the cross bar and the pair of lower legs and configured to cover a portion of the motor; and a plurality of bushings secured to the pair of opposed brackets and configured to be mounted to a frame of the electric vehicle, wherein the bushings allow the motor, the pair of opposed brackets, the attachment structure, and the plate to move in an upward direction in response to an applied load exceeding a predetermined threshold to the plate.

2. The electric vehicle of claim 1, wherein the cross bar has a square shaped cross-section.

3. The electric vehicle of claim 1, wherein the plate includes a plurality of stiffening beads spaced apart in the transverse direction of the electric vehicle.

4. The electric vehicle of claim 3, wherein one or more stiffening beads of the plurality of stiffening beads extend in the longitudinal direction of the electric vehicle, and wherein one or more stiffening beads of the plurality of stiffening beads extend in an oblique direction relative to the longitudinal direction of the electric vehicle.

5. The electric vehicle of claim 1, wherein the attachment structure further includes a pair of upper legs extending in an oblique direction relative to the longitudinal direction of the electric vehicle and secured to the pair of opposed brackets.

6. The electric vehicle of claim 5, wherein the pair of lower legs extend further in a forward direction of the electric vehicle than the pair of upper legs.

7. The electric vehicle of claim 5, wherein each of the pair of lower legs includes an attachment wall engaging a respective bracket of the pair of opposed brackets, and wherein the attachment wall is flat.

8. The electric vehicle of claim 5, wherein each of the pair of upper legs includes a flat attachment wall engaging a flat wall of a respective bracket of the pair of opposed brackets.

9. The electric vehicle of claim 8, wherein each flat attachment wall includes a hook that hooks onto the flat wall of the respective bracket to inhibit movement of the attachment structure relative to the pair of opposed brackets.

10. The electric vehicle of claim 1, further comprising fasteners extending through the pair of opposed brackets and the bushings, and configured to extend through the motor to secure the pair of opposed brackets and the bushings to the motor.

11. The electric vehicle of claim 1, wherein the plate includes a lower portion and an upper portion, and wherein the lower portion extends horizontally and the upper portion extends upward at an angle from the lower portion, the upper portion welded to the cross bar.

12. The electric vehicle of claim 11, wherein the lower portion of the plate includes a plurality of stiffening beads spaced apart in a transverse direction of the electric vehicle.

13. An electric vehicle comprising:
a pair of opposed brackets configured to be secured to a motor of the electric vehicle;
an attachment structure including a cross bar and a pair of lower legs, the cross bar extending in a transverse direction of the electric vehicle, the pair of lower legs extending in a longitudinal direction from the cross bar and secured to the pair of opposed brackets;
a plate secured to the cross bar and the pair of lower legs and configured to cover a portion of the motor, the plate includes a lower portion and an upper portion, the lower portion extends horizontally and the upper portion extends upward at an angle from the lower portion, the upper portion welded to the cross bar;
a plurality of bushings secured to the pair of opposed brackets and configured to be mounted to a frame of the electric vehicle; and
a plurality of first fasteners extending through the pair of opposed brackets and the bushings, and configured to extend through the motor to secure the pair of opposed brackets and the bushings to the motor,
wherein the bushings allow the motor, the pair of opposed brackets, the attachment structure, and the plate to move in an upward direction in response to an applied load exceeding a predetermined threshold to the upper portion of the plate.

14. The electric vehicle of claim 13, wherein the cross bar has a square shaped cross-section.

15. The electric vehicle of claim 13, wherein the lower portion of the plate includes a plurality of stiffening beads spaced apart in the transverse direction of the electric vehicle.

16. The electric vehicle of claim 13, wherein the attachment structure further includes a pair of upper legs extending in an oblique direction relative to the longitudinal direction of the electric vehicle and secured to the pair of opposed brackets.

17. The electric vehicle of claim 16, wherein:
each of the pair of lower legs includes a first flat attachment wall engaging a first flat wall of a respective bracket of the pair of opposed brackets; and
each of the pair of upper legs includes a second flat attachment wall engaging a second flat wall of a respective bracket of the pair of opposed brackets.

18. The electric vehicle of claim 17, further comprising:
second fasteners extending through the first flat attachment walls of the pair of lower legs and the first flat walls of the pair of opposed brackets to secure the attachment structure to the pair of opposed brackets; and
third fasteners extending through the second flat attachment walls of the pair of upper legs and the second flat walls of the pair of opposed brackets to further secure the attachment structure to the pair of opposed brackets.

19. The electric vehicle of claim 16, wherein a respective lower leg of the pair of lower legs, a respective upper leg of the pair of uppers legs and a wall of a respective bracket of the pair of brackets cooperate to form a triangular shape.

20. An electric vehicle comprising:
a pair of opposed brackets configured to be secured to a motor of the electric vehicle;
an attachment structure including a cross bar, a pair of lower legs, and a pair of upper legs, the cross bar having a square shape cross-section and extending in a transverse direction of the electric vehicle, the pair of lower legs extending in a longitudinal direction from the cross bar and secured to the pair of opposed brackets, the pair of upper legs extending in an oblique direction relative to the longitudinal direction of the electric vehicle and secured to the pair of opposed brackets;
a plate partially wrapped around the attachment structure and secured to the cross bar and the pair of lower legs, the plate includes a lower portion and an upper portion, the lower portion extends horizontally and the upper portion extends upward at an angle from the lower portion, the upper portion welded to the cross bar;

a plurality of bushings secured to the pair of opposed brackets and configured to be mounted to a frame of the electric vehicle; and a plurality of fasteners extending through the pair of opposed brackets and the bushings, and configured to extend through the motor to secure the pair of opposed brackets and the bushings to the motor, wherein the bushings allow the motor, the pair of opposed brackets, the attachment structure, and the plate to move in an upward direction in response to an applied load exceeding a predetermined threshold to the upper portion of the plate, and wherein a respective lower leg of the pair of lower legs, a respective upper leg of the pair of uppers legs and a wall of a respective bracket of the pair of brackets cooperate to form a triangular shape.

* * * * *